United States Patent
Zhang et al.

(10) Patent No.: US 12,432,724 B2
(45) Date of Patent: Sep. 30, 2025

(54) PERFORMING RESOURCE MAPPING OF INTER-CELL MULTI TRANSMISSION/RECEPTION POINT OPERATION

(71) Applicant: ZTE CORPORATION, Guangdong (CN)

(72) Inventors: Yang Zhang, Shenzhen (CN); Shujuan Zhang, Shenzhen (CN); Chuangxin Jiang, Shenzhen (CN); Bo Gao, Shenzhen (CN); Hao Wu, Shenzhen (CN); Zhen He, Shenzhen (CN); Zhaohua Lu, Shenzhen (CN); Wenjun Yan, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 333 days.

(21) Appl. No.: 17/877,150

(22) Filed: Jul. 29, 2022

(65) Prior Publication Data

US 2023/0028824 A1    Jan. 26, 2023

Related U.S. Application Data

(63) Continuation of application No. PCT/CN2020/119918, filed on Oct. 9, 2020.

(51) Int. Cl.
*H04W 72/1273* (2023.01)
*H04L 5/00* (2006.01)
(Continued)

(52) U.S. Cl.
CPC ....... *H04W 72/1273* (2013.01); *H04L 5/0051* (2013.01); *H04W 24/10* (2013.01); *H04W 56/001* (2013.01); *H04W 72/1268* (2013.01)

(58) Field of Classification Search
CPC ..... H04L 5/0044; H04L 5/0051; H04L 5/001; H04W 72/1273; H04W 24/10; H04W 56/001; H04W 72/1268
See application file for complete search history.

(56) References Cited

U.S. PATENT DOCUMENTS

2019/0306875 A1    10/2019  Zhou et al.
2019/0364488 A1*   11/2019  Frenger ................. H04W 76/11
(Continued)

FOREIGN PATENT DOCUMENTS

| CN | 110063039 A | 7/2019 |
|---|---|---|
| WO | WO-2020/165702 A1 | 8/2020 |
| WO | WO-2020/198667 A1 | 10/2020 |

OTHER PUBLICATIONS

FUTUREWEI ("Inter-cell multi-TRP operation", 3GPP TSG RAN WG1 #102-e, R1-2005286, Aug. 17-28, 2020) (Year: 2020).*

(Continued)

*Primary Examiner* — Ji-Hae Yea
(74) *Attorney, Agent, or Firm* — Foley & Lardner LLP

(57) ABSTRACT

Presented are systems, methods, apparatuses, or computer-readable media for resource mapping of inter-cell multi transmission/reception points (TRPs) operation. A wireless communication device may determine at least one resource element that is scheduled for a defined communication associated with a first configuration index, and is assigned for use for at least one signal associated with a second configuration index. The wireless communication device may perform the defined communication using resource elements other than the determined at least one resource element.

17 Claims, 8 Drawing Sheets

(51) Int. Cl.
*H04W 24/10* (2009.01)
*H04W 56/00* (2009.01)
*H04W 72/1268* (2023.01)

(56) References Cited

U.S. PATENT DOCUMENTS

2020/0205137 A1* 6/2020 Khoshnevisan ...... H04L 5/0094
2021/0127358 A1* 4/2021 Li .......................... H04W 80/02

OTHER PUBLICATIONS

Lenovo, Motorola Mobility ("Enhancements on Multi-TRP inter-cell operation", 3GPP TSG RAN WG1#102-e, R1-2005822, Aug. 17-28, 2020) (Year: 2020).*
CATT ("Discussion on multi-TRP/panel inter-cell operation", 3GPP TSG RAN WG1 Meeting #102, R1-2005685, Aug. 17-28, 2020) (Year: 2020).*
Qualcomm Incorporated ("Enhancement on Multi-TRP inter-cell operation", 3GPP TSG-RAN WG1 Meeting #102-e, R1-2006792, Aug. 17-28, 2020) (Year: 2020).*
Huawei et al.: "Rate matching for data channels" 3GPP TSG RAN WG1 NR Ad-Hoc#3; R1-1715463; Sep. 21, 2017; Nagoya, Japan (7 pages).
International Search Report and Written Opinion for PCT Appl. No. PCT/CN2020/119918, mailed Jul. 15, 2021 (8 pages).
Apple Inc., "On Inter-Cell Multi-TRP Enhancement" 3GPP TSG-RAN WG1 Meeting #102-e, R1-2006501, Aug. 28, 2020, e-Meeting (2 pages).
CATT, "Discussion on multi-TRP/panel inter-cell operation" 3GPP TSG RAN WG1 Meeting #102, R1-2005685, Aug. 28, 2020, e-Meeting (2 pages).
CMCC, "Enhancements on Multi-TRP inter-cell operation" 3GPP TSG RAN WG1 #102-e, R1-2006202, Aug. 28, 2020, e-Meeting (1 page).
Futurewei, "Clarification of synchronization aspect for inter-cell multi-TRP in Rel-17 FeMIMO WI" RAN 89e, RP-201895, Sep. 18, 2020 (4 pages).
Futurewei, "Inter-cell multi-TRP operation" 3GPP TSG RAN WG1 #102-e, R1-2005286, Aug. 28, 2020, e-Meeting (5 pages).
Huawei et al., "Enhancements on inter-cell Multi-TRP operations in Rel-17" 3GPP TSG RAN WG1 Meeting #102-e, R1-2006392, Aug. 28, 2020, e-Meeting (3 pages).
Intel Corporation, "MIMO multi-TRP timing constraints for inter-cell operation" 3GPP TSG RAN Meeting #89-e, RP-201839, Sep. 18, 2020, Electronic Meeting (3 pages).
Intel Corporation, "Multi-TRP enhancements for inter-cell operation" 3GPP TSG RAN WG1 #102-e, R1-2005860, Aug. 28, 2020, e-Meeting (8 pages).
Lenovo et al., "Enhancements on Multi-TRP inter-cell operation" 3GPP TSG RAN WG1#102-e, R1-2005822, Aug. 28, 2020, e-Meeting (3 pages).
LG Electronics, "Enhancements on Multi-TRP inter-cell operation" 3GPP TSG RAN WG1 #102-e, R1-2006598, Aug. 28, 2020, e-Meeting (2 page).
Moderator (VIVO), "Feature lead summary on Enhancements on Multi-TRP inter-cell operation" 3GPP TSG RAN WG1 #102-e, R1-2007313, Aug. 18, 2020, e-Meeting (14 pages).
Nokia et al., "Enhancements to enable inter-cell multi-TRP operations" 3GPP TSG RAN WG1 #102e, R1-2006845, Aug. 28, 2020 (7 pages).
NTT Docomo Inc., "Discussion on inter-cell multi-TRP operations" 3GPP TSG RAN WG1 #102-e, R1-2006720, Aug. 28, 2020, e-Meeting (3 pages).
OPPO, "Enhancement on inter-cell multi-TRP operation" 3GPP TSG RAN WG1 #102e, R1-2005985, Aug. 28, 2020, e-Meeting (3 pages).
Qualcomm Incorporated, "Enhancements on Multi-TRP inter-cell operation" 3GPP TSG-RAN WG1 Meeting #102-e, R1-2006792, Aug. 28, 2020, e-Meeting (4 pages).
Samsung, "Enhancements on multi-TRP inter-cell operation" 3GPP TSG RAN WG1 #102, R1-2006130, Aug. 28, 2020, e-Meeting (3 pages).
Sharp, "Enhancement on inter-cell multi-TRP operation" 3GPP TSG RAN WG1 #102, R1-2006567, Aug. 28, 2020, e-Meeting (3 pages).
Spreadtrum Communication, "Discussion on enhancement multi-TRP inter-cell operation" 3GPP TSG RAN WG1#102-e, R1-2006259, Aug. 28, 2020, e-Meeting (3 pages).
Xiaomi, "Enhancement on Inter-cell Multi-TRP operations" 3GPP TSG RAN WG1 #102-e, R1-2006545, Aug. 28, 2020, e-Meeting (3 pages).
ZTE, "Discussion on Multi-TRP inter-cell operation" 3GPP TSG RAN WG1 #102-e, R1-2005456, Aug. 28, 2020, e-Meeting (3 pages).
Extended European Search Report for EP Appl. No. 20956495.4, dated Oct. 10, 2023 (11 pages).
NTT Docomo, Inc., "Discussion on multi-beam operation", 3GPP TSG RAN WG1 #102-e, R1-2006717, Aug. 28, 2020, e-Meeting (14 pages).
VIVO, "Discussion on multi-beam enhancement", 3GPP TSG RAN WG1 #102-e, R1-2005363, Aug. 28, 2020, e-Meeting (21 pages).
Extended European Search Report for EP Appl. No. 25157217.8, dated Jul. 14, 2025 (10 pages).

* cited by examiner

PERFORMING RESOURCE MAPPING OF INTER-CELL MULTI TRANSMISSION/RECEPTION POINT OPERATION

CROSS-REFERENCE TO RELATED APPLICATION

This application claims the benefit of priority under 35 U.S.C. § 120 as a continuation of PCT Patent Application No. PCT/CN2020/119918, filed on Oct. 9, 2020, the disclosure of which is incorporated herein by reference in its entirety.

TECHNICAL FIELD

The disclosure relates generally to wireless communications, including but not limited to systems and methods for resource mapping of inter-cell multi-transmission/reception point (TRP) operation.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, a method, an apparatus, or a computer-readable medium. A wireless communication device may determine at least one resource element that is scheduled for a defined communication associated with a first configuration index, and is assigned for use for at least one signal associated with a second configuration index. The wireless communication device may perform the defined communication using resource elements other than the determined at least one resource element.

In some embodiments, the defined communication may include reception of a physical downlink shared channel (PDSCH). In some embodiments, the at least one signal may include a SS/PBCH block (SSB). In some embodiments, the first configuration index may be same as the second configuration index.

In some embodiments, the first configuration index or the second configuration index may include a transmission configuration indicator (TCI) state index, a physical cell identity (PCI) index, or a control resource set (CORESET) pool index. In some embodiments, the SSB may be used as or associated with a quasi co-location (QCL) source corresponding to the PDSCH. The SSB may be used for RRM measurement, or may be configured in a higher-layer parameter MeasObjectNR information element (IE).

In some embodiments, the SSB may be indicated in a TCI state of a TCI state list configured by radio resource control (RRC) signalling. The TCI state list may be associated with a serving cell of the PDSCH. In some embodiments, the SSB may be indicated in a TCI state of a TCI state list activated by a media access control element (MAC CE) signalling. The TCI state list may be associated with a bandwidth part (BWP) of the PDSCH. In some embodiments, the SSB may be indicated in a TCI state indicated by a downlink control information (DCI) signalling. The TCI state may be associated with the PDSCH.

In some embodiments, the SSB may be used as a QCL source of a tracking reference signal (TRS) or a channel state information reference signal (CSI-RS) for mobility measurement. The TRS or the CSI-RS may include a QCL source of the PDSCH. In some embodiments, the SSB may be used for positioning.

In some embodiments, the SSB may be used as or associated with a QCL source corresponding to at least one other signal or channel other than the PDSCH. In some embodiments, the at least one other signal or channel may include another PDSCH, and a configuration index of the another PDSCH may be same as the first configuration index.

In some embodiments, the defined communication may include reception of a physical downlink shared channel (PDSCH). In some embodiments, the at least one signal may include a SS/PBCH block. In some embodiments, the first configuration index may be different from the second configuration index.

In some embodiments, the first configuration index or the second configuration index may include a transmission configuration indicator (TCI) state index, a physical cell identity (PCI) index, or a control resource set (CORESET) pool index. In some embodiments, the SSB may be used as or associated with a quasi co-location (QCL) source corresponding to the PDSCH. The SSB may be used for RRM measurement, or may be configured in a higher-layer parameter MeasObjectNR information element (IE).

In some embodiments, the SSB may be indicated in a TCI state of a TCI state list configured by radio resource control (RRC) signalling. The TCI state list may be associated with a serving cell of the PDSCH. In some embodiments, the SSB may be indicated in a TCI state of a TCI state list activated by a media access control element (MAC CE) signalling. The TCI state list may be associated with a bandwidth part (BWP) of the PDSCH. In some embodiments, the SSB may be indicated in a TCI state indicated by a downlink control information (DCI) signalling. The TCI state may be associated with the PDSCH.

In some embodiments, the SSB may be used as a QCL source of a tracking reference signal (TRS) or a channel state information reference signal (CSI-RS) for mobility measurement. The TRS or the CSI-RS may include a QCL source of the PDSCH. In some embodiments, the SSB may be used for positioning. In some embodiments, the SSB may be used as or associated with a QCL source corresponding to at least one other signal or channel other than the PDSCH.

In some embodiments, the at least one other signal or channel may include another PDSCH, and a configuration index of the another PDSCH is same as the first configuration index.

In some embodiments, the defined communication may include reception of a physical downlink shared channel (PDSCH). In some embodiments, the at least one signal may include a channel state information reference signal (CSI-RS). In some embodiments, the first configuration index is same as the second configuration index.

In some embodiments, the first configuration index or the second configuration index may include a transmission configuration indicator (TCI) state index, a physical cell identity (PCI) index, or a control resource set (CORESET) pool index. In some embodiments, the CSI-RS may be used as or associated with a quasi co-location (QCL) source corresponding to the PDSCH. The CSI-RS may be used for mobility measurement, or may be configured in a higher-layer parameter MeasObjectNR information element (IE).

In some embodiments, the CSI-RS may be indicated in a TCI state of a TCI state list configured by radio resource control (RRC) signalling, the TCI state list associated with a serving cell of the PDSCH. In some embodiments, the CSI-RS may be indicated in a TCI state of a TCI state list activated by a media access control element (MAC CE) signalling. The TCI state list may be associated with a bandwidth part (BWP) of the PDSCH. In some embodiments, the CSI-RS may be indicated in a TCI state indicated by a downlink control information (DCI) signalling. The TCI state may be associated with the PDSCH.

In some embodiments, the CSI-RS may be used for positioning, tracking, or computation of layer 1 reference signal received power (L1-RSRP) or layer 1 signal-to-interference ratio (L1-SINR). In some embodiments, the CSI-RS maybe used as or associated with a QCL source corresponding to at least one other signal or channel other than the PDSCH. In some embodiments, the at least one other signal or channel may include another PDSCH, and a configuration index of the another PDSCH is same as the first configuration index.

In some embodiments, the defined communication may include reception of a physical downlink shared channel (PDSCH). In some embodiments, the at least one signal may include a channel state information reference signal (CSI-RS). In some embodiments, the first configuration index may be different from the second configuration index.

In some embodiments, the first configuration index or the second configuration index may include a transmission configuration indicator (TCI) state index, a physical cell identity (PCI) index, or a control resource set (CORESET) pool index. In some embodiments, the CSI-RS may be used as or associated with a quasi co-location QCL source corresponding to the PDSCH. The SSB may be used for RRM measurement, or may be configured in a higher-layer parameter MeasObjectNR information element (IE).

In some embodiments, the CSI-RS may be indicated in a TCI state of a TCI state list configured by radio resource control (RRC) signalling. The TCI state list may be associated with a serving cell of the PDSCH. In some embodiments, the CSI-RS may be indicated in a TCI state of a TCI state list activated by a media access control element (MAC CE) signalling. The TCI state list may be associated with a bandwidth part (BWP) of the PDSCH. In some embodiments, the CSI-RS may be indicated in a TCI state indicated by a downlink control information (DCI) signalling. The TCI state may be associated with the PDSCH.

In some embodiments, the CSI-RS may be used for positioning, tracking, or computation of layer 1 reference signal received power (L1-RSRP) or layer 1 signal-to-interference ratio (L1-SINR). In some embodiments, the CSI-RS may be used as or associated with a QCL) source corresponding to at least one other signal or channel other than the PDSCH. In some embodiments, the at least one other signal or channel may include another PDSCH, and a configuration index of the another PDSCH is same as the first configuration index.

In some embodiments, the defined communication may include reception of a physical downlink shared channel (PDSCH). In some embodiments, the at least one signal may include another PDSCH. In some embodiments, the first configuration index may be same as or different from the second configuration index. In some embodiments, the first configuration index or the second configuration index may include a transmission configuration indicator (TCI) state index, a physical cell identity (PCI) index, or a control resource set (CORESET) pool index.

In some embodiments, the defined communication may include transmission of a physical uplink shared channel (PUSCH). In some embodiments, the at least one signal may include a sounding reference signal (SRS). In some embodiments, the first configuration index may be same as the second configuration index.

In some embodiments, the first configuration index or the second configuration index may include spatial relation information (SRI) information, a transmission configuration indicator (TCI) state index, a physical cell identity (PCI) index, or a control resource set (CORESET) pool index. In some embodiments, the SRS may be used as or associated with a quasi co-location (QCL) source corresponding to the PUSCH. The SRS may be used for mobility measurement, or may be configured in a higher-layer parameter MeasObjectNR information element (IE).

In some embodiments, the SRS may be indicated in spatial relation information (SRI) index configured by radio resource control (RRC) signalling. The spatial relation information (SRI) index may be associated with a serving cell of the PUSCH. In some embodiments, the SRS may be indicated in spatial relation information activated by a media access control control element (MAC CE) signalling. The spatial relation information may be associated with a bandwidth part (BWP) of the PUSCH. In some embodiments, the SRS may be indicated in spatial relation information (SRI) index indicated by a downlink control information (DCI) signalling. The spatial relation information may be associated with the PUSCH.

In some embodiments, the SRS may be used for channel sounding, positioning, antenna switching, carrier switching, computation of reference signal received power (RSRP) or signal and interference to noise ratio (SINR), or configuration of one or more transmit power control (TPC) commands. In some embodiments, the SRS may be used as or associated with a QCL source corresponding to at least one other signal or channel other than the PUSCH. In some embodiments, the at least one other signal or channel may include another PUSCH, and a configuration index of the another PUSCH is same as the first configuration index.

In some embodiments, the defined communication may include transmission of a physical uplink shared channel (PUSCH). In some embodiments, the at least one signal may include a sounding reference signal (SRS). In some embodiments, the first configuration index may be different from the second configuration index.

In some embodiments, the first configuration index or the second configuration index may include spatial relation information (SRI) index, a transmission configuration indicator (TCI) state index, a physical cell identity (PCI) index, or a control resource set (CORESET) pool index. In some embodiments, the SRS may be used as or associated with a quasi co-location (QCL) source corresponding to the PUSCH. The SRS may be used for mobility measurement, or may be configured in a higher-layer parameter MeasObjectNR information element (IE).

In some embodiments, the SRS may be indicated in spatial relation information configured by radio resource control (RRC) signalling. The spatial relation information (SRI) index may be associated with a serving cell of the PUSCH. In some embodiments, the SRS may be indicated in spatial relation information activated by a media access control element (MAC CE) signalling. The spatial relation information (SRI) index may be associated with a bandwidth part (BWP) of the PUSCH. In some embodiments, the SRS may be indicated in spatial relation information indicated by a downlink control information (DCI) signalling. The spatial relation information (SRI) index may be associated with the PUSCH.

In some embodiments, the SRS may be used for channel sounding, positioning, antenna switching, carrier switching, computation of reference signal received power (RSRP) or signal and interference to noise ratio (SINR), or configuration of one or more transmit power control (TPC) commands.

In some embodiments, the defined communication may include transmission of a physical uplink shared channel (PUSCH). In some embodiments, the at least one signal may include another PUSCH. In some embodiments, the first configuration index may be same as or different from the second configuration index. In some embodiments, the first configuration index or the second configuration index may include spatial relation information (SRI) index, a transmission configuration indicator (TCI) state index, a physical cell identity (PCI) index, or a control resource set (CORESET) pool index.

At least one aspect is directed to a system, a method, an apparatus, or a computer-readable medium. A wireless communication device may receive, from a wireless communication node, an indication that a set of resources is scheduled for a first defined communication and a second defined communication. The first defined communication is associated with a first physical cell identity (PCI) value, and the second defined communication is associated with a second PCI value.

In some embodiments, the first defined communication may be one of: a downlink reception or an uplink transmission, and the second defined communication is another of: the downlink reception or the uplink transmission. In some embodiments, the wireless communication device may deter to perform only one of the first defined communication or the second defined communication, using the scheduled set of resources.

In some embodiments, the wireless communication device may determine that the set of resources is configured or indicated for at least one of: the first defined communication or the first PCI value. In some embodiments, the wireless communication device may determine that the second communication would overlap with the first defined communication in at least part of the set of resources. In some embodiments, the wireless communication device may determine, responsive to the determination that the second communication would overlap with the first defined communication, to perform only the first defined communication, using the scheduled set of resources.

In some embodiments, the first defined communication may include a SS/PBCH block (SSB) that is used for radio resource management (RRM) measurement, or is configured in a higher-layer parameter MeasObjectNR information element (IE). In some embodiments, the first defined communication may include a channel state information reference signal (CSI-RS) that is used as a quasi co-location (QCL) source of another first defined communication associated with the first PCI value.

In some embodiments, the second defined communication may include a physical downlink shared channel (PDSCH), a physical uplink shared channel (PUSCH), a preamble random access channel (PRACH), or a sounding reference signal (SRS). In some embodiments, the first defined communication may include a sounding reference signal (SRS) that is used for radio resource management (RRM) measurement, or is configured in a higher-layer parameter MeasObjectNR information element (IE).

In some embodiments, the second defined communication may include a physical downlink control channel (PDCCH), a physical downlink shared channel (PDSCH), a channel state information reference signal (CSI-RS), or a downlink positioning reference signal (DL-PRS) which is without a measurement gap.

In some embodiments, at least one of the first defined communication or the second defined communication may include a plurality of downlink receptions within a reception timing window. In some embodiments, the wireless communication device may determine that a largest time difference between any two of the plurality of downlink receptions exceeds a cyclic prefix (CP).

In some embodiments, the wireless communication device may perform only one of the plurality of downlink receptions within the reception timing window. In some embodiments, the one of the plurality of downlink receptions may have a highest priority among the plurality of downlink receptions. In some embodiments, the reception timing window may include a set of symbols or slots. In some embodiments, the wireless communication device may perform only a subset of the plurality of downlink receptions within the reception timing window.

In some embodiments, the subset of the plurality of downlink receptions may be from a same cell or configured with a same physical cell identity (PCI) value. In some embodiments, the subset of the plurality of downlink receptions may be associated with one or more PCI values. In some embodiments, the reception timing window may include a set of symbols or slots.

In some embodiments, a wireless communication node may transmit, to a wireless communication device, an indication that a set of resources is scheduled for a first defined communication and a second defined communication. In some embodiments, the first defined communication may be associated with a first physical cell identity (PCI) value, and the second defined communication may be associated with a second PCI value.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

Figure 1:
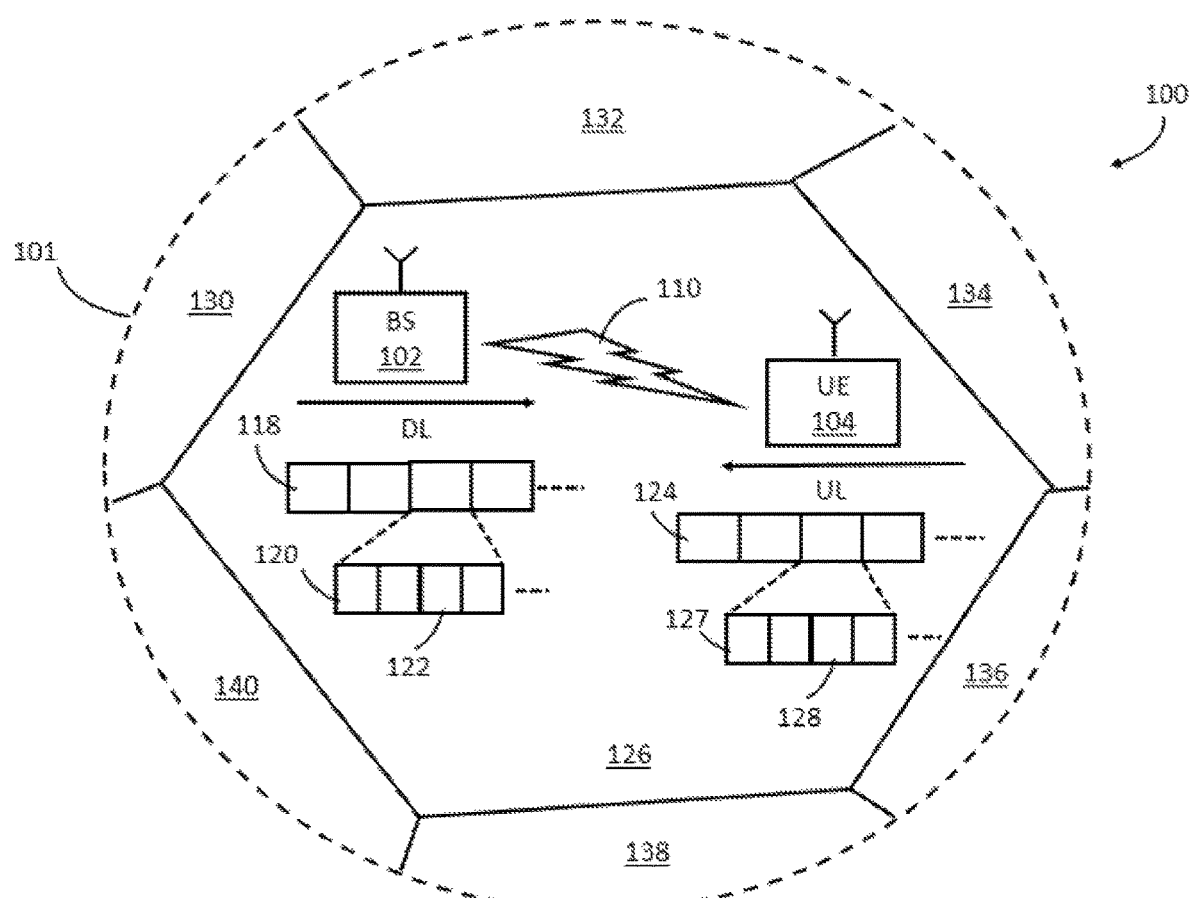
FIG. 1 illustrates an example cellular communication network in which techniques disclosed herein may be implemented, in accordance with an embodiment of the present disclosure.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

The following acronyms are used throughout the present disclosure:

| Acronym | Full Name |
| --- | --- |
| 3GPP | 3rd Generation Partnership Project |
| 5G | 5th Generation Mobile Networks |
| 5G-AN | 5G Access Network |
| 5G gNB | Next Generation NodeB |

| Acronym | Full Name |
| --- | --- |
| BWP | Bandwidth Part |
| CCE | Control Channel Element |
| CDM | Code-Division Multiplexing |
| CE | Control Element |
| CN | Core Network |
| CORESET | Control Resource Set |
| CP | Cyclic Prefix |
| CSI-RS | Channel State Information, Reference Signal |
| DCI | Downlink Control Information |
| DMRS or DM-RS | Demodulation Reference Signal |
| DL | Down Link or Downlink |
| HST | High-Speed Train |
| IE | Information Element |
| L1 | Layer 1 |
| MAC | Media Access Control |
| MIMO | Multiple Input Multiple Output |
| NG | Next Generation |
| NW | Network |
| OFDM | Orthogonal Frequency-Division Multiplexing |
| OFDMA | Orthogonal Frequency-Division Multiple Access |
| PBCH | Physical Broadcast Channel |
| PCI | Physical Cell Identity |
| PDCCH | Physical Downlink Control Channel |
| PDCP | Packet Data Convergence Protocol |
| PDSCH | Physical Downlink Shared Channel |
| PHY | Physical Layer |
| PRACH | Preamble Random Access Channel |
| PRS | Positioning Reference Signal |
| PTRS or PT-RS | Phase Tracking Reference Signal |
| PUCCH | Physical Uplink Control Channel |
| QCL | Quasi-Co-Location |
| RA | Random Access |
| RLC | Radio Link Control |
| RNTI | Radio Network Temporary Identity |
| RRC | Radio Resource Control |
| RRM | Radio Resource Management |
| RS | Reference Signal |
| RSRP | Reference Signal Received Power |
| SFN | Single Frequency Network |
| SINR | Signal to Interference Plus Noise Ratio |
| SSB | Synchronization Signal/Physical Broadcast Channel (SS/PBCH) Block |
| TB | Transport Block |
| TCI | Transmission Configuration Indicator |
| TRP | Transmission/Reception Point |
| TRS | Tracking Reference Signal |
| UE | User Equipment |
| UL | Up Link or Uplink |

1. Mobile Communication Technology and Environment

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
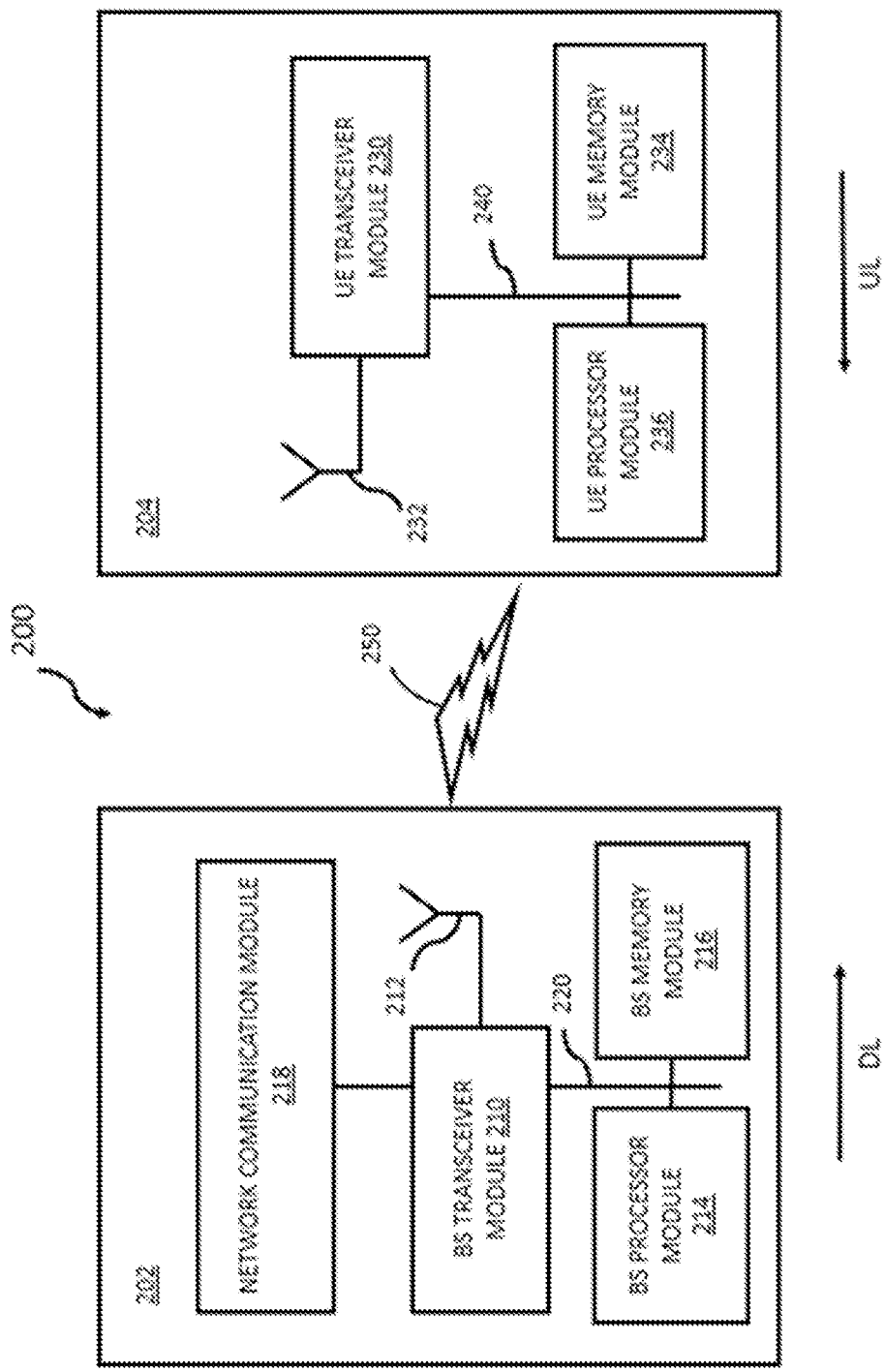
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

Figure 3:
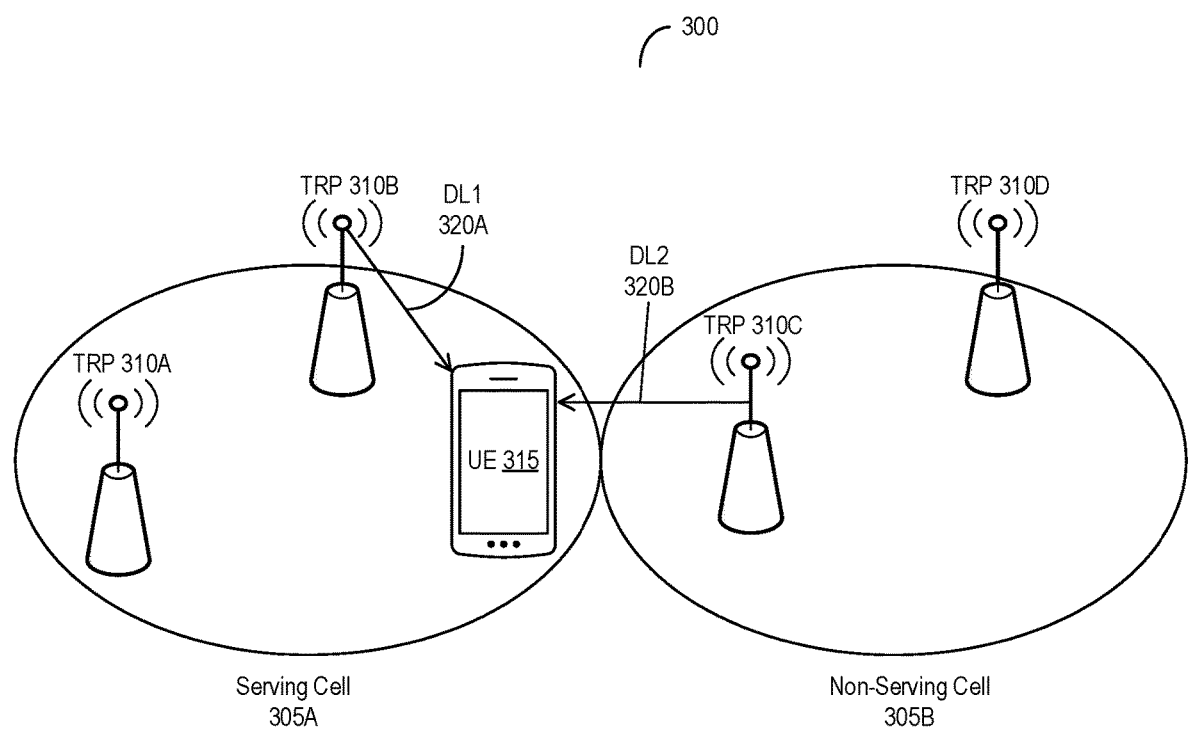
FIG. 3 illustrates a block diagram of an example system for resource mapping of inter-cell multi transmission/reception point (TRP) operation in accordance with an illustrative embodiment.

2. Systems and Methods for Resource Mapping of Inter-Cell Multi Transmission/Reception Point Operation Referring now to FIG. 3, depicted is an environment or a system 300 for resource mapping of inter-cell multi transmission/reception point (TRP) operation. The system 300 may include at least one serving cell 305A and at least one serving cell 305B. The system 300 may include one or more TRPs 310A-D (hereinafter generally referred to as TRPs 310) arranged across the serving cell 305A and the non-serving cell 305B. The system 300 may include at least one user equipment (UE) 315 located and supported by the serving cell 305A. At least one TRP 310 (e.g., the TRP 310B) in the serving cell 305A may have at least one downlink connection (DL1) 320A with the UE 315. At least one TRP 310 (e.g., TRP 310C) in the non-serving cell 305B may have at least one downlink connection (DL2) 320B with the UE 315.

To enhance the robustness and reliability for transmission, some features and functionalities (e.g., as defined in 5G NR) related to TRP operations may be introduced. For example, 5G NR may include a number of multiple input, multiple output (MIMO) features that facilitate utilization of a large number of antenna elements at base station for both sub-6 GHz and over-6 GHz frequency bands. One of the MIMO features may support multi-TRP operation. This functionality may collaborate with multiple TRPs 310 which belong to the serving cell 305A to transmit data to the UE 315 to improve transmission performance. Using these features and functionalities, when the multi-TRP for inter-cell operation is supported, the UE 315 may be able to transmit or receive signals from the serving cell 305A and the non-serving cell 305B at the same time. For example, when the UE 315 is located at the cell-edge, inter-cell multi-TRP operation may be performed to further enhance the reliability and robustness of channel transmission. Many issues may arise for the UE from the inter-cell multi-TRP operations.

Firstly, in terms of resource mapping processing in the existing 5G NR system, modulation symbols may be mapped to the resource elements in the set of resource blocks assigned by the media access control (MAC) scheduler for user data transmissions, such as a physical downlink shared channel (PDSCH) or a physical uplink shared channel (PUSCH). Using these, at least some of the resource elements within the scheduled resource blocks may not be available for the PDSCH or PUSCH when used for reference signals, control channels, and system information, among others. With inter-cell multi-TRP operation, however, the UE 315 can perform PDSCH reception and PUSCH transmission to the non-serving cell 305B as well. Accordingly, the resource elements used for such transport channels may consider excluding the part (e.g., resource elements) of the reference signals related to the non-serving cell 305A.

Secondly, under the scenario of inter-cell multi-TRP operation, avoiding the collision between the uplink transmission and downlink reception occurring in a set of symbols or slots may have to be considered. Thirdly, when the UE 315 receives multiple downlink signals related to different cells, due to the capability of the UE 315, only one or a limited number of the signals can be received in a same reception timing window simultaneously. These and other issues may be addressed in the present disclosure.

A. Mapping of PDSCH to SS/PBCH Blocks (SSBs)

The UE may perform an uplink/downlink communication, such as a PDSCH reception or PUSCH transmission, that is mapped to a set of resource blocks. A part or all of the resource elements corresponding to certain signals related to different configuration index within the scheduled resource blocks may not be available or used for the PDSCH or PUSCH. Generally, as a downlink physical-layer processing of PDSCH, resource mapping may serve one of the purposes to map the modulation symbols to the available resource elements in the set of the corresponding physical resource blocks assigned for PDSCH. However, some or all of the resource elements corresponding or related to some of the signals within the scheduled resource blocks may not be available or used for the PDSCH. These and other issues may be addressed in the following manner.

Figure 4:
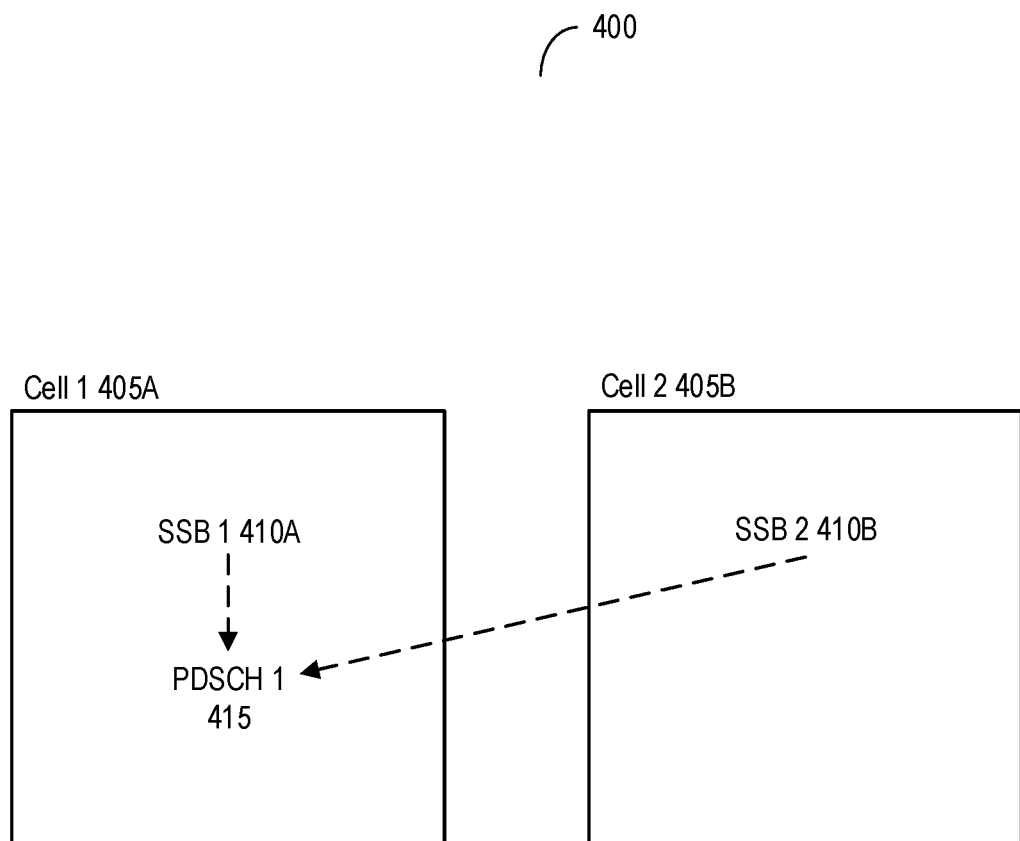
FIG. 4 illustrates a block diagram of an example resource mapping of a physical downlink shared channel (PDSCH) with SS/PBCH blocks (SSBs) in accordance with an illustrative embodiment.

Referring now to FIG. 4, depicted is a block diagram of a resource mapping 400 performed by a user equipment (UE) 315 across two cells 405A and 405B (e.g., serving cell 305A or non-serving cell 305B). In accordance to the resource mapping 400, the UE 315 may map a set of synchronization signal/physical broadcast channel (SS/PBCH) blocks (SSB) 410A and 410B to a PDSCH 1 415 (or vice-versa). In some embodiments, the signals can include a SSB (e.g., synchronization signal/physical broadcast channel (SS/PBCH) block), and the configuration index associated with the SSB may be same as that of the PDSCH. In some embodiments, the configuration index can be/include/represent a transmission configuration indicator (TCI) state index, PCI (physical cell identity), or a control resource set (CORESET) pool index. In some embodiments, the configuration index of the PDSCH may be the configuration index corresponding to the QCL source of the PDSCH.

In some embodiments, the SSB can be a SSB used as or associated to QCL source corresponding to the PDSCH. In some embodiments, the SSB can be a SSB used for RRM measurement. The SSB can be a SSB configured in the higher-layer parameter MeasObjectNR information element (IE). In some embodiments, the SSB indicated in a TCI state of a TCI state list configured by radio resource control (RRC), the TCI state list may be associated or related to the serving cell of the PDSCH. In some embodiments, the SSB may be indicated in a TCI state of a TCI state list which is activated by MAC-CE. The TCI state list may be associated or related to the BWP of the PDSCH. Furthermore, the index of one or multiple TCI states of TCI state list may correspond to one codepoint in the field of MAC CE. In some embodiments, the SSB is indicated in a TCI state which is indicated by DCI. The TCI state may be associated with or related to the PDSCH.

In some embodiments, the SSB can be a SSB used as quasi-co-location (QCL) source of TRS (such as CSI-RS for tracking), or CSI-RS for mobility. In some embodiments, the tracking reference signal (TRS) or CSI-RS for mobility measurement can be the QCL source of the PDSCH. In some embodiments, the TRS or CSI-RS for RRM measurement may be indicated in a TCI state of a TCI state list configured by RRC. The TCI state list may be associated with or related to the serving cell of the other signal or channel. In some embodiments, the TRS or CSI-RS may be indicated in a TCI state of a TCI state list which is activated by MAC CE, the TCI state list associated with or related to the bandwidth part (BWP) of the other signal or channel. Furthermore, the index of one or multiple TCI states of the TCI state list may correspond to one codepoint in the field of MAC CE. In some embodiments, the TRS or CSI-RS may be indicated in a TCI state which is indicated by DCI. The TCI state may be associated with or related to the other signal/channel.

In some embodiments, the SSB can be a SSB used for positioning. In some embodiments, the SSB may be indicated in a TCI state of a TCI state list configured by radio resource control (RRC) signalling/configuration (received from a gNB for instance). The TCI state list may be associated with or related to the serving cell of the PDSCH. In some embodiments, the SSB may be indicated in a TCI state of a TCI state list which is activated by MAC CE (received from a gNB for instance). The TCI state list may be associated or related to the BWP of the PDSCH. Furthermore, the index of one or multiple TCI states of a TCI state list may correspond to one codepoint in the field of MAC CE. In some embodiments, the SSB may be indicated in a TCI state which is indicated by DCI (from a gNB for instance). The TCI state may be associated with or related to the PDSCH.

In some embodiments, the SSB can be a SSB used as or associated to QCL source corresponding to one or more signals or channels other than the PDSCH. In some embodiments, the other signal or channel may be another PDSCH. In some embodiments, the configuration index of the another PDSCH may be same as that of the PDSCH.

In some embodiments, the signals can include a SSB (e.g., SS/PBCH block), and the configuration index associated with the SSB should be different from that of the PDSCH. In some embodiments, the configuration index can be a TCI state index, PCI (physical cell identity), or CORESET pool index. In some embodiments, the configuration index of the PDSCH may be the configuration index corresponding to the QCL source of the PDSCH. In some embodiments, the SSB can be a SSB used as or associated to QCL source corresponding to the PDSCH. In some embodiments, the SSB can be a SSB used for RRM measurement, or the SSB can be a SSB configured in the higher-layer parameter MeasObjectNR information element (IE).

In some embodiments, the SSB may be indicated in a TCI state of a TCI state list configured by RRC signalling/configuration. The TCI state list may be associated with or related to the serving cell of the PDSCH. In some embodiments, the SSB may be indicated in a TCI state of a TCI state list which is activated by MAC CE. The TCI state list may be associated or related to the BWP of the PDSCH. Furthermore, the index of one or more TCI states of the TCI state list may correspond to one codepoint in the field of MAC CE. In some embodiments, the SSB is indicated in a TCI state which is indicated by DCI. The TCI state may be associated with or related to the PDSCH.

In some embodiments, the SSB can be a SSB used as QCL source of TRS (such as CSI-RS for tracking), or CSI-RS for mobility (measurement). In some embodiments, the TRS or CSI-RS for mobility can be the QCL source of the PDSCH. In some embodiments, the TRS or CSI-RS for mobility may be indicated in a TCI state of a TCI state list configured by RRC (radio resource control). The TCI state list may be associated or related to the serving cell of the PDSCH. In some embodiments, the TRS or CSI-RS for mobility may be indicated in a TCI state of a TCI state list which is activated by MAC CE. The TCI state list may be associated or related to the BWP of the PDSCH. Furthermore, the index of one or multiple TCI states of a TCI state list may correspond to one codepoint in the field of MAC CE. In some embodiments, the TRS or CSI-RS for mobility may be indicated in a TCI state which is indicated by DCI. The TCI state may be associated with or related to the PDSCH.

In some embodiments, the SSB can be a SSB used for positioning. In some embodiments, the SSB may be indicated in a TCI state of a TCI state list configured by RRC configuration/signalling (from a gNB for instance). The TCI state list may be associated or related to the serving cell of the PDSCH. In some embodiments, the SSB may be indicated in a TCI state of a TCI state list which can be activated by MAC CE. The TCI state list may be associated or related to the BWP of the PDSCH. Furthermore, the index of one or multiple TCI states of TCI state list may correspond to one codepoint in the field of MAC CE (e.g., transmitted from the gNB). In some embodiments, the SSB is indicated in a TCI state which is indicated by DCI. The TCI state may be associated with or related to the PDSCH.

In some embodiments, the SSB can be a SSB used as or associated to QCL source corresponding to signals or channels other than the PDSCH. In some embodiments, the other signal or channel may be another PDSCH. In some embodiments, the configuration index of the another PDSCH is different from that of the PDSCH.

B. Mapping of PDSCH to Channel State Information Reference Signals (CSI-RS)

Generally, as a downlink physical-layer processing of PDSCH, resource mapping may serve to map the modulation symbols to the available resource elements in the set of the resource blocks assigned for PDSCH. However, some or all of the resource elements corresponding or related to some kinds of signals within the scheduled resource blocks may not be available or used for the PDSCH. These and other issues may be addressed in the following manner.

Figure 5:
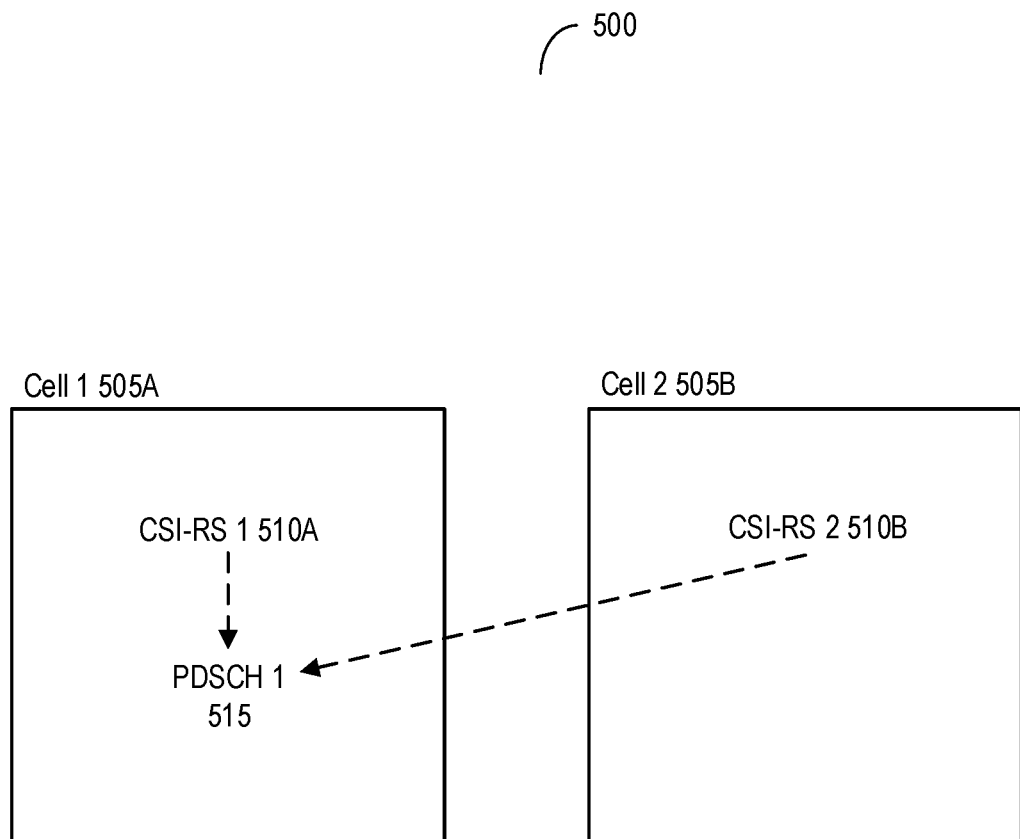
FIG. 5 illustrates a block diagram of an example resource mapping of a physical downlink shared channel (PDSCH) with channel state information reference signals (CSI-RSs) in accordance with an illustrative embodiment.

Referring now to FIG. 5, depicted is a block diagram of a resource mapping 400 performed by a user equipment (UE) 315 across two cells 505A and 505B (e.g., serving cell 305A or non-serving cell 305B). In accordance to the resource mapping 500, the UE 315 may map a set of CSI-RSs 510A and 510B to a PDSCH 1 515 (or vice-versa). In some embodiments, the signals can be a channel state information reference signal (CSI-RS), and the configuration index (or cell) associated with the CSI-RS should be same as that of the PDSCH. In some embodiments, the configuration index can be/include/represent a TCI state index, PCI (physical cell identity), or CORESET pool index. In some embodiments, the configuration index of the PDSCH may be the configuration index corresponding to the QCL source of the PDSCH. In some embodiments, the CSI-RS can be a CSI-RS used as or associated to QCL source corresponding to the PDSCH.

In some embodiments, the CSI-RS can be a CSI-RS used for mobility (e.g., mobility measurement), or the CSI-RS can be a CSI-RS configured in the higher-layer parameter MeasObjectNR IE. In some embodiments, the CSI-RS may be indicated in a TCI state of a TCI state list configured by RRC configuration/signalling. The TCI state list may be associated or related to the serving cell of the PDSCH. In some embodiments, the CSI-RS may be indicated in a TCI state of a TCI state list which is activated by MAC CE, the TCI state list associated or related to the BWP of the PDSCH. Furthermore, the index of one or multiple TCI states of TCI state list may correspond to one codepoint in the field of MAC CE (e.g. from a gNB). In some embodiments, the CSI-RS may be indicated in a TCI state which is indicated by DCI (e.g., from the gNB). The TCI state may be associated with or related to the PDSCH.

In some embodiments, the CSI-RS can be a CSI-RS used for positioning, tracking, or L1-RSRP (layer 1 reference signal received power) or L1-SINR (Layer 1 signal-to-interference ratio) computation. In some embodiments, the CSI-RS may be indicated in a TCI state of a TCI state list configured by RRC configuration/signalling. The TCI state list may be associated with or related to the serving cell of the PDSCH. In some embodiments, the CSI-RS may be indicated in a TCI state of a TCI state list which is activated by MAC CE, the TCI state list associated or related to the BWP of the PDSCH. Furthermore, the index of one or multiple TCI states of TCI state list may correspond to one codepoint in the field of MAC CE. In some embodiments, the CSI-RS may be indicated in a TCI state which is indicated by DCI, the TCI state associated or related to the PDSCH.

In some embodiments, the CSI-RS can be a CSI-RS used as or associated to QCL source corresponding to one or more signals or channels other than the PDSCH. In some embodiments, the other signal(s) or channel(s) may be/include another PDSCH. In some embodiments, the configuration index of the another PDSCH may be same as that of the PDSCH.

In some embodiments, the signals can be/include a CSI-RS, and a configuration index associated with the CSI-RS may be different from that of the PDSCH. In some embodiments, the configuration index can be/include/represent a TCI state index, PCI (physical cell identity), or CORESET pool index. In some embodiments, the configuration index of the PDSCH may be the configuration index corresponding to the QCL source of other signals or channels rather than the PDSCH. In some embodiments, the CSI-RS can be a CSI-RS used as or associated with QCL source corresponding to the PDSCH.

In some embodiments, the CSI-RS can be a CSI-RS used for mobility (e.g., mobility measurement), or the CSI-RS can be a CSI-RS configured in the higher-layer parameter MeasObjectNR IE. In some embodiments, the CSI-RS may be indicated in a TCI state of a TCI state list configured by RRC configuration/signalling. The TCI state list may be associated or related to the serving cell of the PDSCH. In some embodiments, the CSI-RS may be indicated in a TCI state of a TCI state list which is activated by MAC CE. The TCI state list may be associated or related to the BWP of the PDSCH. Furthermore, the index of one or multiple TCI states of a TCI state list may correspond to one codepoint in the field of MAC CE (e.g., from a gNB). In some embodiments, the CSI-RS is indicated in a TCI state which is indicated by DCI, the TCI state associated or related to the PDSCH.

In some embodiments, the CSI-RS can be a CSI-RS used for positioning, tracking, or L1-RSRP (layer 1 reference signal received power) or L1-SINR (Layer 1 signal-to-interference ratio) computation. In some embodiments, the CSI-RS may be indicated in a TCI state of a TCI state list configured by RRC configuration/signalling. The TCI state list may be associated or related to the serving cell of the PDSCH. In some embodiments, the CSI-RS may be indicated in a TCI state of a TCI state list which is activated by MAC CE. The TCI state list may be associated with or related to the BWP of the PDSCH. Furthermore, the index of one or multiple TCI states of a TCI state list may correspond to one codepoint in the field of MAC CE. In some embodiments, the CSI-RS may be indicated in a TCI state which is indicated by DCI (e.g., from the gNB to the UE). The TCI state may be associated or related to the PDSCH.

In some embodiments, the CSI-RS can be a CSI-RS used as or associated to QCL source corresponding to other signals or channels rather than the PDSCH. In some embodiments, the other signals or channels may be another PDSCH. In some embodiments, the configuration index of the another PDSCH may be different from that of the PDSCH.

C. Mapping of PDSCH Using Indices

Generally, as a downlink physical-layer processing of PDSCH, resource mapping may serve to map the modulation symbols to the available resource elements in the set of the resource blocks assigned for PDSCH. However, some or all of the resource elements corresponding or related to some kinds of signals within the scheduled resource blocks may not be available or used for the PDSCH. These and other issues may be addressed in the following manner.

In some embodiments, the signals can be another PDSCH. In some embodiments, the configuration index associated with the another PDSCH can be same with that associated with the PDSCH. In some embodiments, the configuration index can be/include/represent a TCI state index, PCI (physical cell identity), or CORESET pool index. In some embodiments, the configuration index associated with the other PDSCH can be different from that associated with the PDSCH. In some embodiments, the configuration index can be a TCI state index, PCI (physical cell identity), or CORESET pool index. In some embodiments, the signals can be a DM-RS (demodulation reference signal) used for the PDSCH. In some embodiments, the signals can be a PT-RS (phase-tracking reference signal) used for the PDSCH.

D. Mapping of PUSCH to Resources

Generally, as an uplink physical-layer processing of PUSCH, resource mapping serves one of the purposes that is to map the modulation symbols to the available resource elements in the set of the resource blocks assigned for PUSCH. However, some or all of the resource elements corresponding or related to some kinds of signals within the scheduled resource blocks may not be available or used for the PUSCH. These and other issues may be addressed in the following manner.

Figure 6:
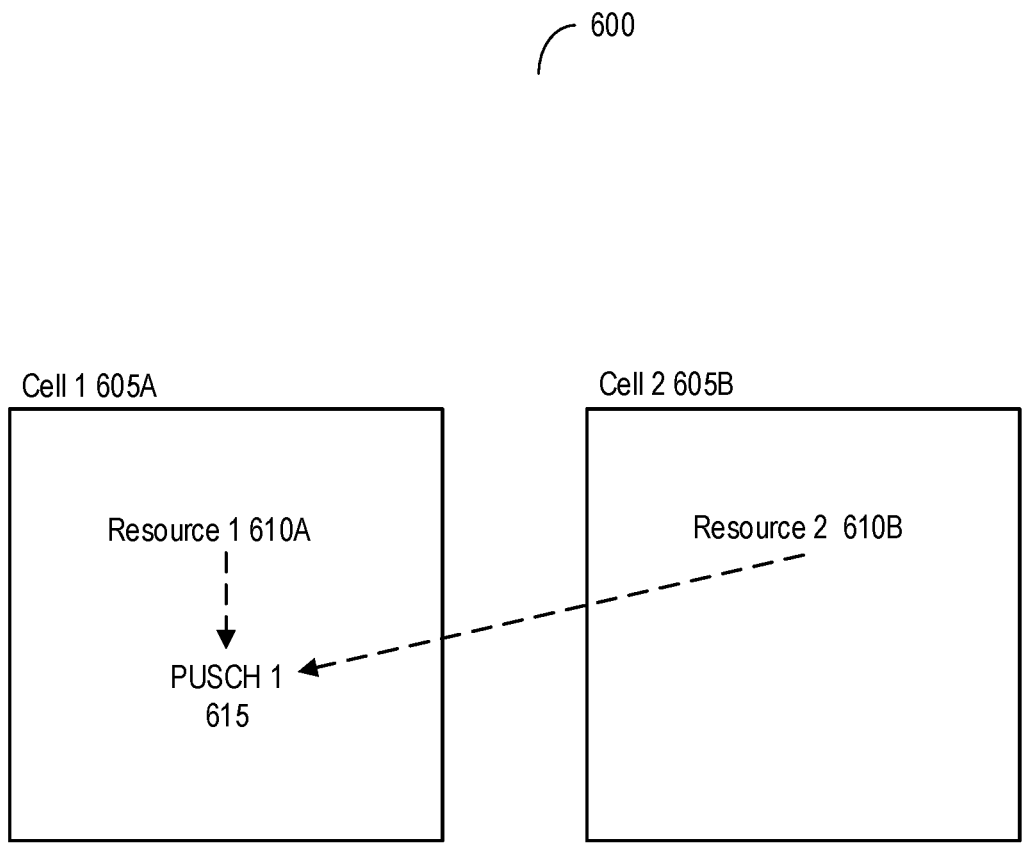
FIG. 6 illustrates a block diagram of an example resource mapping of a physical uplink shared channel (PUSCH) with resources in accordance with an illustrative embodiment.

Referring now to FIG. 6 depicted is a block diagram of a resource mapping 600 performed by a user equipment (UE) 315 across two cells 605A and 605B (e.g., serving cell 305A or non-serving cell 305B). In accordance to the resource mapping 600, the UE 315 may map a set of resources 610A and 610B to a PUSCH 1 615 (or vice-versa). In some embodiments, the signals can be/include a SRS (sounding reference signal), and a configuration index associated with the SRS may be same as that of the PUSCH. In some embodiments, the configuration index can be/include/represent spatial relation info, TCI state index, PCI (physical cell identity), or CORESET pool index. In some embodiments, the configuration index of the PUSCH may be the configuration index corresponding to the QCL source of the PUSCH.

In some embodiments, the SRS can be a SRS used as or associated to QCL source corresponding to the PUSCH. In some embodiments, the SRS can be a SRS used for mobility, or the SRS can be a SRS configured in the higher-layer parameter MeasObjectNR IE. In some embodiments, the SRS may be indicated in a spatial relation info configured by RRC (radio resource control) configuration/signalling from the wireless communication node (e.g., gNB) to the wireless communication device (e.g., UE). The spatial relation info may be associated or related to the serving cell of the PUSCH. In some embodiments, the SRS is indicated in a spatial relation info which is activated by MAC CE from the wireless communication node (e.g., gNB) to the wireless communication device (e.g., UE), the spatial relation info associated or related to the bandwidth part (BWP) of the PUSCH. In some embodiments, the SRS may be indicated in a spatial relation info which is indicated by DCI, the spatial relation info associated with or related to the PUSCH.

In some embodiments, the SRS can be a SRS used for channel sounding, positioning, antenna switching, carrier switching, RSRP or signal to interference and noise ratio (SINR) computation, or TPC commands configuration. In some embodiments, the SRS may be indicated in a spatial relation info configured by RRC (radio resource control) configuration/signalling. The spatial relation info may be associated or related to the serving cell of the PUSCH. In some embodiments, the SRS may be indicated in a spatial relation info which is activated by MAC CE, the spatial relation info associated or related to the BWP of the PUSCH. In some embodiments, the SRS may be indicated in a spatial relation info which is indicated by DCI, the spatial relation info associated with or related to the PUSCH.

In some embodiments, the SRS can be a SRS used as or associated to QCL source corresponding to other signals or channels rather/other than the PUSCH. In some embodiments, the other signals or channels may be another PUSCH.

In some embodiments, the configuration index of the another PUSCH may be same as that of the PUSCH.

In some embodiments, the signals can be/include a SRS, and a configuration index associated with the SRS may be different from the PDSCH. In some embodiments, the configuration index can be/include/represent spatial relation info, TCI state index, PCI (physical cell identity), or CORESET pool index. In some embodiments, the configuration index of the PUSCH may be the configuration index corresponding to the QCL source of the PUSCH. In some embodiments, the SRS can be a SRS used as or associated with the QCL source corresponding to the PUSCH.

In some embodiments, the SRS can be a SRS used for mobility (e.g., mobility measurement), or the SRS can be a SRS configured in the higher-layer parameter MeasObjectNR IE. In some embodiments, the SRS may be indicated in a spatial relation info configured by RRC configuration/signalling (from a wireless communication node). The spatial relation info may be associated with or related to the serving cell of the PUSCH. In some embodiments, the SRS may be indicated in a spatial relation info which is activated by MAC CE (from a wireless communication node). The spatial relation info list may be associated or related to the BWP of the PUSCH. In some embodiments, the SRS may be indicated in a spatial relation info which is indicated by DCI (from a wireless communication node to the wireless communication device). The spatial relation info may be associated with or related to the PUSCH.

In some embodiments, the SRS can be a SRS used for channel sounding, positioning, antenna switching, carrier switching, RSRP or a signal to interference and noise ratio (SINR) computation, or TPC commands configuration. In some embodiments, the SRS may be indicated in a spatial relation info configured by RRC signalling/configuration. The spatial relation info may be associated with or related to the serving cell of the PUSCH. In some embodiments, the SRS may be indicated in a spatial relation info which is activated by MAC CE. The spatial relation info may be associated with or related to the BWP of the PUSCH. In some embodiments, the SRS may be indicated in a spatial relation info which is indicated by DCI (e.g., from a gNB). The spatial relation info may be associated with or related to the PUSCH.

E. Mapping of PUSCH Using Indices

Generally, as an uplink physical-layer processing of PUSCH, resource mapping may serve to map the modulation symbols to the available resource elements in the set of the resource blocks assigned for the PUSCH. However, some or all of the resource elements corresponding or related to some kinds of signals within the scheduled resource blocks may not available or usable for the PUSCH. In some embodiments, a configuration index associated with another PUSCH can be same that of the PUSCH. In some embodiments, the configuration index can be/include/represent spatial relation info, a transmission configuration indicator (TCI) state index, physical cell identity (PCI), or CORESET pool index. In some embodiments, the configuration index associated with the another PUSCH can be different from that of the PUSCH. In some embodiments, the configuration index can be/include/represent spatial relation info, TCI state index, PCI, or CORESET pool index. In some embodiments, the signals can be/include other demodulation reference signal (DM-RS) used for the PUSCH. In some embodiments, the signals can be/include a demodulation reference signal (e.g., a phase tracking reference signal (PT-RS)) used for the PUSCH.

F. Scheduling of Downlink Reception or Uplink Transmission within Set of Symbols A UE may be scheduled by a network (NW) to only perform a downlink reception and/or a uplink transmission within a set of symbols or slots, and the downlink reception and the uplink transmission may be related to or associated with different physical cell identity (PCI) values. The UE may be scheduled by NW (e.g., a wireless communication node such as a gNB) to perform one downlink reception and one uplink transmission within a set of symbols and slots simultaneously. However, the UE may only perform one of the downlink reception or the uplink transmission within the set of symbols and slots. In the scenario of inter-cell multi-TRP operation, downlink receptions and uplink transmissions may be related or associated to different PCI values respectively. Meanwhile, due to the capability of the UE, a set of symbols or slots can only be configured or indicated as being for an uplink transmission or a downlink reception. These and other issues may be addressed in the following manner.

In some embodiments, for the set of (one or more) symbols or slots configured or indicated to the UE as a downlink reception related or associated to the one PCI, the UE may not perform an uplink transmission related or associated to the other PCI, when the uplink transmission overlaps with the set of symbols or slots. In some embodiments, the one PCI may be different from the other PCI. In some embodiments, the performed downlink reception can be/include a SSB which can be used as the QCL source of other downlink receptions configured or indicated by the one PCI. In some embodiments, the SSB can be a SSB used for RRM measurement, or the SSB can be a SSB configured in the higher-layer parameter MeasObjectNR IE. In some embodiments, the other downlink reception can be a PDSCH, PDCCH, or CSI-RS. In some embodiments, the CSI-RS can be used for tracking, mobility, or L1-RSRP or L1-SINR computation.

In some embodiments, the performed downlink reception can be a CSI-RS which used as the QCL source of other downlink receptions configured or indicated by the one PCI. In some embodiments, the CSI-RS can be used for tracking. In some embodiments, the CSI-RS can be used for mobility measurement. In some embodiments, the CSI-RS can be used for L1-RSRP or L1-SINR computation.

In some embodiments, the unperformed uplink transmission can be a PUSCH, physical uplink control channel (PUCCH), preamble random access channel (PRACH), or SRS. In some embodiments, when the downlink reception is configured by higher layer signalling/configuration, the uplink transmission cannot be indicated by a DCI format. Otherwise, the downlink reception may not be performed by the UE. In some embodiments, when the downlink reception is configured by higher layer signalling over at least one symbol and a PUSCH reception is indicated by a DCI format 0_1 over multiple slots, which may also be overlapped with the downlink reception within one slot, the UE may not transmit the PUSCH in the one slot.

G. Controlling Downlink Reception or Uplink Transmission

In the scenario of inter-cell multi-TRP operation, downlink receptions and uplink transmissions may be related or associated to different PCI values respectively. Meanwhile, due to the capability of the UE, a set of symbols or slots may only be configured or indicated for uplink transmission or downlink reception. These and other issues may be addressed in the following manner.

In some embodiments, for the set of symbols or slots that are configured or indicated to the UE for an uplink transmission related or associated to the one PCI, the UE may not perform the downlink reception related or associated to the other PCI, when the downlink reception overlaps with the same set of symbols or slots. In some embodiments, the one PCI may be different from the other PCI. In some embodiments, the performed uplink transmission can be/include a SRS which can be used as the spatial relation of other uplink transmissions configured or indicated by the one PCI. In some embodiments, the SRS can be a SRS used for RRM measurement, or the SRS can be a SRS configured in the higher-layer parameter MeasObjectNR IE. In some embodiments, the other uplink transmission can be a PRACH, PUSCH, or PUCCH. In some embodiments, the unperformed downlink reception can be a PDCCH, PDSCH, CSI-RS, or DL-PRS which is without a measurement gap.

In some embodiments, when the uplink transmission is configured by higher layer signalling/configuration, the downlink reception may not be indicated by a DCI format. Otherwise, the uplink transmission would not be performed by the UE. In some embodiments, when the uplink transmission is a valid PRACH, the set of symbols or slots may include $N_{gap}$ symbols located/residing before the valid PRACH occasion. In some embodiments, when the uplink transmission is configured by higher layer signalling/configuration over at least one symbol, and the PDSCH reception is indicated by a DCI format 1_1 over multiple slots which is also overlapped with the uplink transmission within one slot, the UE may not receive the PDSCH in the one slot.

H. Scheduling Multiple Downlink Receptions Using Priorities

A UE may be scheduled to perform multiple downlink receptions by one reception timing window. The UE may perform a set of the multiple downlink receptions within the reception timing window. When the UE receives multiple downlink signals in a same reception timing window simultaneously, the timing misalignment between the received signals may fall within the cyclic prefix (CP). For the case of multi-TRP operation, when the largest time difference between any of multiple downlink transmissions exceeds the CP, only one downlink transmission can be received within the reception timing window due to the UE's capability. These and other issues may be addressed in the following manner.

In some embodiments, the reception timing window can be/include a set of symbols or slots. In some embodiments, the set of symbols or slots can be discontinuous or non-contiguous in time. In some embodiments, the one downlink transmission may have the highest priority. In some embodiments, the priority can be configured by RRC, or activated by the MAC CE, or indicated by DCI. In some embodiments, the priority may depend on the absolute or relative receiving timing of the one downlink signal. In some embodiments, the priority may depend on the sequence of the one downlink signal/transmission.

In some embodiments, when two of the one downlink transmissions are received within two different reception timing windows respectively, the reception timing interval of or between the two time windows may exceed a threshold. In some embodiments, the threshold can be configured by RRC configuration/signalling, or activated by the MAC CE, or indicated by DCI. In some embodiments, the PCI associated with the two downlink transmissions can be different with each other.

I. Scheduling Multiple Downlink Receptions Using Indices

When the UE receives multiple downlink signals in a same reception timing window simultaneously, the timing misalignment between the received signals should fall within the cyclic prefix (CP). For the case of multi-TRP operation, when the largest time difference between any of multiple downlink transmissions from TRPs exceeds the CP, only limited (certain) downlink transmissions can be received within the reception timing window simultaneously, due to the UE's (limited) capability. These and other issues may be addressed in the following manner.

In some embodiments, the reception timing window can be a set of symbols or slots. In some embodiments, the set of symbols or slots can be discontinuous in time. In some embodiments, the limited downlink transmissions may come from a same cell or be configured with a same PCI. In some embodiments, the PCIs associated with the limited downlink transmissions can be same or different with each other. In some embodiments, the timing misalignment between the multiple downlink transmissions may fall within the CP. In some embodiments, the timing misalignment between the multiple downlink transmissions can be allowed to exceed the CP.

J. Process for Performing Resource Mapping of Channels

Figure 7:
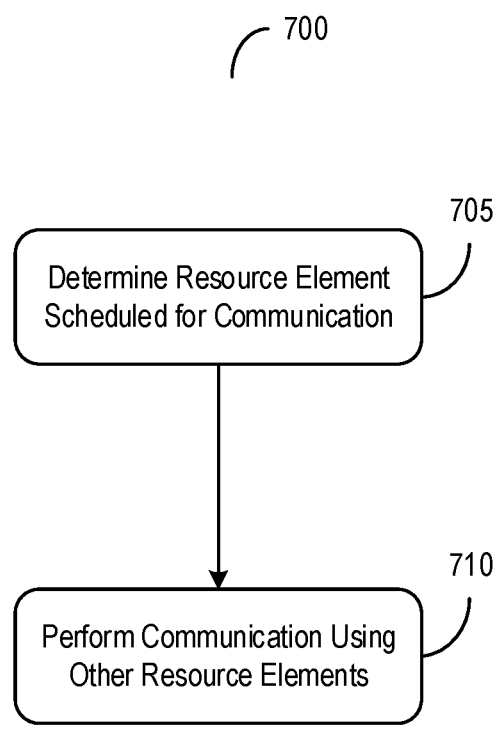
FIG. 7 illustrates a flow diagram of a method of performing resource mapping of channels to resource elements in inter-cell multi transmission/reception points (TRPs) operations in accordance with an illustrative embodiment.

Referring now to FIG. 7, depicted is a flow diagram of a method 700 of performing resource mapping of channels to resource elements in inter-cell multi transmission/reception points (TRPs) operations. The method 700 may be implemented by or performed using any of the components described above, such as the BS 102, UE 104, serving cell 305A, non-serving cell 305B, TRPs 310, and UE 315, among others. In brief overview, a wireless communication device may determine a resource element scheduled for a communication (705). The wireless communication device may perform the communication using one or more other resource elements (710).

In further detail, a wireless communication device (e.g., UE 104 or 315) may identify or determine at least one resource element scheduled for a communication (705). The wireless communication device may be located and served by a serving cell (e.g., the serving cell 305A). The wireless communication device may be in communication with at least one wireless communication node (e.g., TRP 310) in the serving cell and at least one wireless communication node in a non-serving cell (e.g., the non-serving cell 305B). The wireless communication device may be scheduled to perform a downlink communication (e.g., DL 320A or 320B) with one of the wireless communication node at the serving cell or at the non-serving cell.

The at least one resource element may be scheduled for a defined communication associated with a first configuration index. The at least one resource element may be assigned for use for at least one signal associated with a second configuration index. Configuration indices may correspond to a particular cell (e.g., the serving cell 305A or the non-serving cell 305B). The first configuration index may reference the defined communication (e.g., PUSCH, or PDSCH) to be performed. The second configuration index may reference a signal (e.g., SRS or CSI-RS) to be communicated via one or more assigned resource elements. The signal may be a reference signal to be communicated via the defined communication. The signal may be a reference signal to be communicated via the defined communication. In some embodiments, the defined communication may include a reception of a physical downlink shared channel (PDSCH). The PDSCH may be between the wireless communication device and the wireless communication node. In some embodiments, the defined communication may include a reception of a physical uplink shared channel (PUSCH). The PUSCH may be between the wireless communication device and the wireless communication node.

The signal may be a reference signal to be communicated via the PDSCH or using one or more resource elements assigned to the PDSCH. In some embodiments, the signal may include a synchronization signal/physical broadcast channel (SS/PBCH) block (SSB). In some embodiments, the first configuration index may be the same as the second configuration index. For example, the signal can be a synchronization signal/physical broadcast channel (SS/PBCH) block (SSB), and the configuration index associated with the SSB may be same as that of the PDSCH. In some embodiments, the first configuration index may differ from the second configuration index. For example, the signal can be a synchronization signal/physical broadcast channel (SS/PBCH) block (SSB), and the configuration index associated with the SSB may differ from that of the PDSCH.

In some embodiments, the first configuration index or the second configuration index may identify, reference, or otherwise include a transmission configuration indicator (TCI) state index, a physical cell identity (PCI) index, or a control resource set (CORESET) pool index. The TCI state index may identify a TCI state to be used. The PCI index may identify a particular cell to be used. The CORESET pool index may indicate a collection of CORESET to be used.

The SSB may be used for one or more applications with respect to the PDSCH. In some embodiments, the SSB may be used as or associated with a quasi co-location (QCL) source corresponding to the PDSCH. The QCL source may reference the PDSCH to be used for the SSB. The SSB may be used for radio resource management (RRM) measurements. The SSB may be also used for a higher-layer parameter information element (IE) (e.g., MeasObjectNR). The RRM measurements may include measurements of co-channel interference, coding, resources, reception characteristics, and transmission characteristics, among others.

In some embodiments, the SSB may be indicated in a TCI state of a TCI state list configured by a higher-layer configuration (e.g., radio resource control (RRC)) signalling (from the wireless communication node). The TCI state list may be associated with the serving cell of PDSCH. In some embodiments, the SSB may be indicated in a TCI state of a TCI state list activated by a media access control, control element (MAC CE) signalling (from the wireless communication node). The TCI state list may be associated with a bandwidth part (BWP) of the PDSCH. In some embodiments, the SSB may be indicated in a TCI state indicated by a downlink control information (DCI) signalling (from the wireless communication node). The TCI state may be associated with the PDSCH.

In some embodiments, the SSB may be used as QCL source of tracking reference signal (TRS) or channel state information reference signal (CSI-RS) for mobility measurement. The TRS or the CSI-RS may a QCL source of PDSCH. In some embodiments, the SSB may be used for positioning. The positioning may include determining a position of the wireless communication device relative to the wireless communication node for transmission via the PDSCH. In some embodiments, the SSB may be used as or associated with a QCL source corresponding to one or more other signals or channels other than the PDSCH. The other signals or channels may be other than the defined communication. In some embodiments, the other signal or channel may another PDSCH. In addition, a configuration index of the another PDSCH may be the same as the first configuration index.

In some embodiments, the signal may include a channel state information reference signal (CSI-RS). In some embodiments, the first configuration index may be the same as the second configuration index. For example, the signal can be a CSI-RS, and the configuration index associated with the CSI-RS may be same with that of the PDSCH. In some embodiments, the first configuration index may differ from the second configuration index. For example, the signal can be a CSI-RS, and the configuration index associated with the CSI-RS may differ from that of the PDSCH.

In some embodiments, the first configuration index or the second configuration index may identify, reference, represent or otherwise include a transmission configuration indicator (TCI) state index, a physical cell identity (PCI) index, or a control resource set (CORESET) pool index. The TCI state index may identify TCI state to be used. The PCI index may identify a particular cell to be used. The CORESET pool index may indicate a collection of CORESET to be used.

The CSI-RS may be used for one or more applications with respect to the PDSCH. In some embodiments, CSI-RS may be used as or associated with a quasi co-location (QCL) source corresponding to the PDSCH. The QCL source may reference the PDSCH to be used for the CSI-RS. The CSI-RS may be used for a radio resource management (RRM) measurements. The CSI-RS may be also used for a higher-layer parameter information element (IE) (e.g., MeasObjectNR). The RRM measurements may include measurements of co-channel interference, coding, resources, reception characteristics, and transmission characteristics, among others.

In some embodiments, the CSI-RS may be indicated in a TCI state of a TCI state list configured by a higher-layer configuration (e.g., radio resource control (RRC)) signalling (e.g., from the wireless communication node to the wireless communication device). The TCI state list may be associated with the serving cell of PDSCH. In some embodiments, the CSI-RS may be indicated in a TCI state of a TCI state list activated by a media access control element (MAC CE) signalling (e.g., from the wireless communication node to the wireless communication device). The TCI state list may be associated with a bandwidth part (BWP) of the PDSCH. In some embodiments, the CSI-RS may be indicated in a TCI state indicated by a downlink control information (DCI) signalling (e.g., from the wireless communication node to the wireless communication device). The TCI state may be associated with the PDSCH.

In some embodiments, the CSI-RS may be used for positioning, tracking, or computation of layer 1 reference signal received power (L1-RSRP) or layer 1 signal-to-interference ratio (L1-SINR). In some embodiments, the CSI-RS may be used as or associated with a (QCL) source corresponding to at least one other signal or channel other than the PDSCH. The other signals or channels may be other than, or different from the defined communication. In some embodiments, one or more other signals or channels may include another PDSCH. A configuration index of the other PDSCH may be the same as the first configuration index.

In some embodiments, the signal may include another PDSCH. In some embodiments, the first configuration index may be the same as the second configuration index. In some embodiments, the first configuration index may be different from the second configuration index. In some embodiments, the first configuration index or the second configuration index may identify, reference, represent or otherwise include a transmission configuration indicator (TCI) state index, a physical cell identity (PCI) index, or a control resource set (CORESET) pool index. The TCI state index may identify TCI state to be used. The PCI index may identify a particular cell to be used. The CORESET pool index may be used to identify a collection of CORESET to be used.

The signal may be a reference signal to be communicated via the PUSCH. In some embodiments, the signal may include a sounding reference signal (SRS). In some embodiments, the first configuration index may be same as the second configuration index. For example, the signal can be the SRS, and the configuration index associated with the SRS may be the same as that of the PUSCH. In some embodiments, the first configuration index may be same as the second configuration index. For example, the signal can be the SRS, and the configuration index associated with the SRS may be differ from that of the PUSCH.

In some embodiments, the first configuration index may identify, represent or include spatial relation information (SRI) information, a transmission configuration indicator (TCI) state index, a physical cell identity (PCI) index, or a control resource set (CORESET) pool index. In some embodiments, the second configuration index may also identify, represent or include spatial relation information (SRI) information, a transmission configuration indicator (TCI) state index, a physical cell identity (PCI) index, or a control resource set (CORESET) pool index. The TCI state index may identify TCI state to be used. The PCI index may identify a particular cell to be used. The CORESET pool index may indicate or identify a collection of CORESET to be used.

In some embodiments, the SRS may be used as or associated with a quasi co-location (QCL) source corresponding to the PUSCH. The QCL source may reference the PUSCH to be used for the SRS. In some embodiments, the SRS is used for mobility measurement, or is configured in a higher-layer parameter information element (IE) (e.g., MeasObjectN). In some embodiments, the SRS may be used as or associated with a QCL source corresponding to at least one other signal or channel other than the PUSCH. The other signals or channels may be other than, or different from the defined communication. In some embodiments, the other signal or channel may include another PUSCH. In addition, a configuration index of the another PUSCH may be same as the first configuration index.

The SRS may be defined, specified, or otherwise indicated by a higher-layer signalling. In some embodiments, the SRS may be indicated by a spatial relation information (SRI) index configured by radio resource control (RRC) signalling (e.g., transmitted to the wireless communication device). The spatial relation information (SRI) index may be associated with the serving cell of the PUSCH. The SRI index may indicate which SRI to be used in the communication via PUSCH. In some embodiments, the SRS may be indicated in SRI index activated by a media access control element (MAC CE) signalling (e.g., transmitted to the wireless communication device). The SRI index may be associated with a bandwidth part (BWP) of the PUSCH. In some embodiments, the SRS may be indicated by downlink control information (DCI) signalling (e.g., transmitted to the wireless communication device). The SRI index may be associated with the PUSCH.

In some embodiments, the SRS may be used for channel sounding, positioning, antenna switching, carrier switching, computation of reference signal received power (RSRP) or signal and interference to noise ratio (SINR), or configuration of one or more transmit power control (TPC) commands. Channel sounding may include measuring channel performance across the PUSCH. The positioning may include determining a position of the wireless communication device relative to the wireless communication node for transmission via the PUSCH. The antenna switching may include switching between antenna ports of one of the nodes (e.g., the wireless communication device or the wireless communication node). The carrier switching may include switching between component carriers (CC) on the wireless communication device or the wireless communication node. The TPC commands may identify or define one or more parameters for transmissions in communications between the wireless communication node and the wireless communication device.

In some embodiments, the signal may include another PUSCH. In some embodiments, the first configuration index may be the same as the second configuration index. In some embodiments, the first configuration index may be different from the second configuration index. In some embodiments, the first configuration index or the second configuration index may identify, reference, or otherwise include a transmission configuration indicator (TCI) state index, a physical cell identity (PCI) index, or a control resource set (CORESET) pool index. The TCI state index may identify a TCI state to be used. The PCI index may identify a particular cell to be used. The CORESET pool index may indicate/identify a collection of CORESET to be used.

The wireless communication device may perform the communication using other resource elements (710). The wireless communication may perform the defined communication (e.g., PDSCH or PUSCH) using resource elements other than the one or more determined resource elements. For example, some or all of the resource elements corresponding or related to types of signals within the resource blocks may not be available for the defined communication. In performing the defined communication, the wireless communication device may send the signal to the wireless communication node in accordance with the determined communication (e.g., PDSCH or PUSCH) using the other resource elements.

K. Process for Scheduling Performance of Resource Mapping

Figure 8:
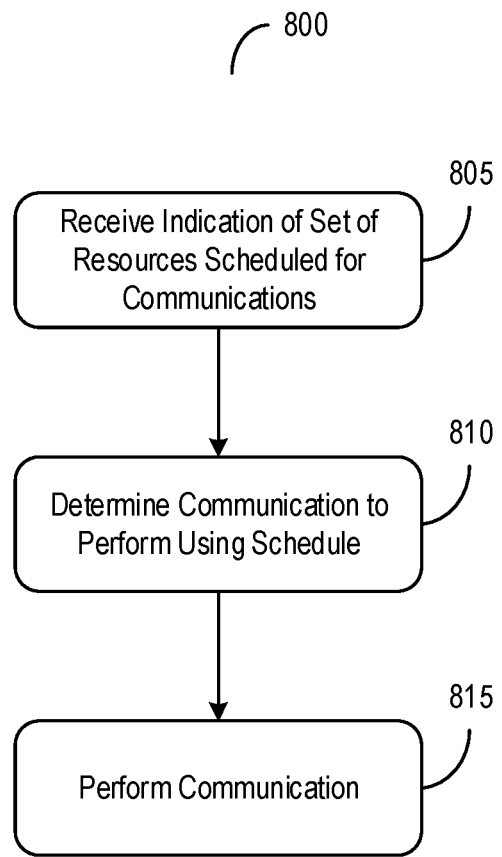
FIG. 8 illustrates a flow diagram of a method of performing resource mapping of channels to resource elements in inter-cell multi transmission/reception points (TRPs) operations in accordance with an illustrative embodiment.

Referring now to FIG. 8, depicted is a flow diagram of a method 800 of scheduling performance of resource mapping of channels to resource elements in inter-cell multi transmission/reception points (TRPs) operations. The method 800 may be implemented by or performed using any of the components described above, such as the BS 102, UE 104, serving cell 305A, non-serving cell 305B, TRPs 310, and UE 315, among others. In brief overview, a wireless communication device may receive an indication of a set of resources scheduled for communications (805). The wireless communication device may select a communication to perform in accordance with a schedule (810). The wireless communication device may perform the communication (815).

In further detail, a wireless communication device (e.g., UE 104 or 315) may identify, retrieve, or otherwise receive an indication of a set of resources scheduled for a first defined communication and a second defined communication (805). The indication of the set of resources may be received from a wireless communication node (e.g., BS 102, TRP 310, or a node of the NW). In some embodiments, the wireless communication node may send, transmit, or otherwise provide the indication of the set of resources to the wireless communication device. The set of resources may identify or include symbol(s) and/or slot(s) for the first defined communications and the second defined communications. The first defined communication may correspond to or may be as associated with a first physical cell identity (PCI) value. The second defined communication may correspond to or may be associated with a second PCI value.

The first defined communication may include, correspond to, or be associated with a downlink reception or uplink transmission between the wireless communication device and the wireless communication node. The second defined communication may include, correspond to, or be associated with a downlink reception or uplink transmission between the wireless communication device and the wireless communication node. In some embodiments, the first defined communication may be different from the second defined communication. For example, when the first defined communication is used for the downlink reception, the second defined communication may be used for the uplink transmission, and vice-versa.

A number of signals, channels, or resources may be used in the set of resources scheduled for performing at least one of the first defined communication and the second defined communication. In some embodiments, the first defined communication may include a synchronization signal/physical broadcast channel (SS/PBCH) block. The SS/PBCH block may be used for radio resource management (RRM) measurement. The SS/PBCH block may be configured in a higher-layer parameter information element (IE) (e.g., MeasObjectNR). In some embodiments, the first defined communication may include a channel state information reference signal (CSI-RS). The CSI-RS may be used as a quasi co-location (QCL) source of another first defined communication associated with the first PCI value. In some embodiments, the first defined communication may include a sounding reference signal (SRS). The SRS may be used for RRM measurement. The SRS may be configured in a higher-layer parameter information element (IE) (e.g., MeasObjectNR).

In some embodiments, the signals, channels, or resources used may differ between the first defined communication and the second communication. In some embodiments, the second defined communication may include a physical downlink shared channel (PDSCH). For example, when the first defined communication includes an uplink transmission, the second defined communication may include the PDSCH. In some embodiments, the second defined communication may include a physical uplink shared channel (PUSCH). For example, when the first defined communication includes a downlink reception, the second defined communication may include the PUSCH. In some embodiments, the second defined communication may include a physical downlink control channel (PDCCH). For example, when the first defined communication includes an uplink transmission, the second defined communication may include the PDCCH. In some embodiments, the second defined communication may include a preamble random access channel (PRACH). In some embodiments, the second defined communication may include a sounding reference signal (SRS). In some embodiments, the second defined communication may include a channel state information reference signal (CSI-RS). In some embodiments, the second defined communication may include a downlink positioning reference signal (DL-PRS). The DL-PRS may be without a measurement gap.

The wireless communication device may identify, select, or otherwise determine one of the first defined communication or the second defined communication to perform in accordance with a schedule (810). In some embodiments, the wireless communication device may determine to perform only one of the first defined communication or the second defined communication. The determination may be in accordance with the set of scheduled resources. Due to the limited capability of the wireless communication device, the set of resources (e.g., symbols or slots) may be only configured or indicated as available for uplink transmission or downlink reception. The schedule may define one or more time windows in which the set of resources are to be available for one of the uplink transmission or downlink reception corresponding to the first defined communication and the second defined communication.

From the set of resources, the wireless communication device may identify or determine that the set of resources is configured for or indicates one of the first defined communication or the second defined communication. In some embodiments, the wireless communication device may identify or determine that the set of resources is configured for or indicates the first defined communication or the first PCI value associated with the first defined communication. In some embodiments, the wireless communication device may identify or determine that the set of resources is configured for or indicates the second defined communication or the second PCI value associated with the second defined communication.

With the identification mentioned above, the wireless communication device may identify or determine whether the first defined communication and the second defined communication overlap. The determination of the overlap may be based on resource elements as defined in the set of resources. In some embodiments, the wireless communication device may determine that the second defined communication overlaps with the first defined communication in at least part of the set of resources. In some embodiments, the wireless communication device may determine that the first defined communication overlaps with the second defined communication in at least part of the set of resources. When the second defined communication is determined to overlap with the first defined communication, the wireless communication device may determine to perform only the first defined communication in accordance with the scheduled set of resources. On the other hand, when the first defined communication is determined to overlap with the second defined communication, the wireless communication device may determine to perform only the second defined communication in accordance with the scheduled set of resources.

The wireless communication device may carry out or otherwise perform one of the first defined communication or the second defined communication in accordance to/with the determination (815). The performance may be for an uplink transmission or a downlink reception. In performing the above, the wireless communication device may handle timing misalignments for downlink receptions. In some embodiments, at least one of the first defined communication or the second defined communication may include a set of downlink receptions within a reception timing window. In some embodiments, the wireless communication device may identify or determine that a largest time difference between any two of the set of downlink receptions exceeds a cyclic prefix (CP). The CP may refer to a prefixing of a symbol to the set of symbols in the downlink reception.

With the determination, the wireless communication device may perform one (e.g., only one) of the set of downlink receptions within the reception time window. In some embodiments, the downlink reception that is performed may correspond to or have a highest priority among the set of downlink receptions. In some embodiments, the reception timing window for the one downlink reception (e.g., only one) may correspond to or may include a set of resources (e.g., symbols or slots) communicated via the one downlink reception. In some embodiments, the wireless communication device may perform only a subset (or certain ones) of the set of downlink receptions within the reception timing window. In some embodiments, the subset of downlink receptions may be from the same cell or configured with the same PCI value. For example, the PCI value may correspond to the first PCI value, when the first defined communication is determined to be performed. In some embodiments, the subset of downlink receptions may correspond to or may be associated with one or more PCI values. For instance, the one or more PCI values may include other values in addition to the first PCI value besides the second PCI value, when the first defined communication is determined to be performed. In some embodiments, the reception timing window may include a set of resources (e.g., symbols or slots) to be communicated via the subset of downlink receptions.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

The invention claimed is:

1. A method comprising:
   determining, by a wireless communication device, that at least one resource element is not available based on (i) the at least one resource element being that is scheduled for a defined communication of a non-serving cell associated with a first configuration index, and (ii) the at least one resource element being assigned for use for at least one signal of the non-serving cell associated with a second configuration index that is same as the first configuration index, wherein the first configuration index comprises a first physical cell identity (PCI) index and the second configuration index comprises a second PCI index; and
   performing, by the wireless communication device, the defined communication using resource elements other than the determined at least one resource element, wherein the at least one resource element is not available for the defined communication.

2. The method of claim 1, wherein:
   the defined communication comprises reception of a physical downlink shared channel (PDSCH), and
   the at least one signal comprises a synchronization signal/physical broadcast channel (SS/PBCH) block (SSB).

3. The method of claim 2, wherein the SSB is used as a quasi co-location (QCL) source corresponding to the PDSCH.

4. The method of claim 3, wherein the SSB is indicated in a transmission configuration indicator (TCI) state of a TCI state list configured by radio resource control (RRC) signaling.

5. The method of claim 1, wherein:
   the defined communication comprises transmission of a physical uplink shared channel (PUSCH), a physical uplink control channel (PUCCH), a preamble random access channel (PRACH), or a sounding reference signal (SRS), and
   the at least one signal comprises a synchronization signal/physical broadcast channel (SS/PBCH) block (SSB).

6. The method of claim 1, wherein:
   the defined communication comprises reception of a physical downlink control channel (PDCCH), or a downlink positioning reference signal (DL-PRS), and
   the at least one signal comprises a synchronization signal/physical broadcast channel (SS/PBCH) block (SSB).

7. A wireless communication device comprising:
   at least one processor configured to:
      determine that at least one resource element is not available based on (i) the at least one resource element being scheduled for a defined communication of a non-serving cell associated with a first configuration index, and (ii) the at least one resource element being assigned for use for at least one signal of the non-serving cell associated with a second configuration index that is same as the first configuration index, wherein the first configuration index comprises a first physical cell identity (PCI) index and the second configuration index comprises a second PCI index; and perform the defined communication using resource elements other than the determined at least one resource element, wherein the at least one resource element is not available for the defined communication.

8. The wireless communication device of claim 7, wherein:
the defined communication comprises reception of a physical downlink shared channel (PDSCH), and
the at least one signal comprises a synchronization signal/physical broadcast channel (SS/PBCH) block (SSB).

9. The wireless communication device of claim 8, wherein the SSB is used as a quasi co-location (QCL) source corresponding to the PDSCH.

10. The wireless communication device of claim 9, wherein the SSB is indicated in a transmission configuration indicator (TCI) state of a TCI state list configured by radio resource control (RRC) signaling.

11. The wireless communication device of claim 7, wherein:
the defined communication comprises transmission of a physical uplink shared channel (PUSCH), a physical uplink control channel (PUCCH), a preamble random access channel (PRACH), or a sounding reference signal (SRS), and the at least one signal comprises a synchronization signal/physical broadcast channel (SS/PBCH) block (SSB).

12. The wireless communication device of claim 7, wherein:
the defined communication comprises reception of a physical downlink control channel (PDCCH), or a downlink positioning reference signal (DL-PRS), and
the at least one signal comprises a synchronization signal/physical broadcast channel (SS/PBCH) block (SSB).

13. A non-transitory computer readable medium storing instructions, which when executed by at least one processor, cause the at least one processor to:

determine that at least one resource element is not available based on (i) the at least one resource element being scheduled for a defined communication of a non-serving cell associated with a first configuration index, and 11) the at least one resource element being assigned for use for at least one signal of the non-serving cell associated with a second configuration index that is same as the first configuration index, wherein the first configuration index comprises a first physical cell identity (PCI) index and the second configuration index comprises a second PCI index; and perform the defined communication using resource elements other than the determined at least one resource element, wherein the at least one resource element is not available for the defined communication.

14. The non-transitory computer readable medium of claim 13, wherein:
the defined communication comprises reception of a physical downlink shared channel (PDSCH), and
the at least one signal comprises a synchronization signal/physical broadcast channel (SS/PBCH) block (SSB).

15. The non-transitory computer readable medium of claim 14, wherein the SSB is used as a quasi co-location (QCL) source corresponding to the PDSCH.

16. The non-transitory computer readable medium of claim 15, wherein the SSB is indicated in a transmission configuration indicator (TCI) state of a TCI state list configured by radio resource control (RRC) signaling.

17. The non-transitory computer readable medium of claim 13, wherein:
the defined communication comprises transmission of a physical uplink shared channel (PUSCH), a physical uplink control channel (PUCCH), a preamble random access channel (PRACH), or a sounding reference signal (SRS), and the at least one signal comprises a synchronization signal/physical broadcast channel (SS/PBCH) block (SSB).

* * * * *